United States Patent Office 2,729,655
Patented Jan. 3, 1956

2,729,655
PRODUCTION OF STEROLS

Sidney E. Miller, St. Paul, and Charles Manly Berry, Minneapolis, Minn., assignors to General Mills, Inc., a corporation of Delaware No Drawing. Application April 28, 1952,
Serial No. 284,821

10 Claims. (Cl. 260—397.25)

The present invention relates to a process of isolating sterols from fatty oils, principally from vegetable oil and vegetable oil residues.

Sterols are found in minute quantities in fatty oils and particularly in vegetable oils. A variety of methods have been used for the isolation of sterols, all of which have been subject to serious handicaps. The typical laboratory procedure involves the saponification of the oil with aqueous alcoholic alkali for the purpose of converting the glycerides into water-soluble soaps. The saponification mixture is then extracted with a water immiscible solvent which removes the unsaponifiable material, including the sterols, from the aqueous reaction mixture. Inasmuch as this method involves the treatment of the whole oil, it is evident that very large volumes of solvents are necessary for the recovery of minute quantities of sterols. In addition, the extraction of the aqueous saponification phase entails numerous operational difficulties due to the tendency of such systems to form emulsions with the water immiscible solvent.

Methods have been devised to overcome the difficulties due to the formation of emulsions, by extracting a solid soap phase instead of an aqueous soap phase. For example, in one variation, calcium soaps are prepared by adding calcium oxide or calcium chloride to the saponification mixture to form calcium soaps. The sterols which are adsorbed on the calcium soaps are recovered by extraction after drying the soaps. This method, however, is subject to the disadvantage that, the recovery of the fatty acids from the calcium soaps is a difficult process involving the formation of large amounts of calcium sulfate.

A further method which has been proposed involves the preparation of dried sodium soaps obtained by saponifying oils with sodium hydroxide. The entire saponification mixture is dried to produce the soaps used for extraction. The physical structure of these sodium soaps is likely to be such that solvent extraction is not conveniently possible. For example, the sodium soaps prepared in the above manner from distillation residues of fatty acids, are gel-like materials containing tars which on drying form waxes which cannot be effectively extracted to separate the sterols.

The present invention involves the formation of a mixture of lower aliphatic esters of the fatty acid materials employed as a starting material and the isolation of the sterols from this mixture of esters. The manner in which the sterol may be isolated may be varied, as will be pointed out more fully hereinafter.

It is therefore an object of the present invention to provide a novel method of recovering sterols from fatty oils and fatty oil residues in which the fatty materials are converted to lower aliphatic esters and the sterols recovered therefrom.

This and other objects of the invention will be more fully apparent from the following description.

A wide variety of starting materials may be employed for the present invention. Animal and vegetable oils may be employed, but are not preferred, in view of the relatively low concentrations of sterols therein. Various residues resulting from fatty oil processing are found to be a more desirable source, both from the standpoint of concentration of sterols and also from the standpoint of cost. For example, when fatty oils are subjected to an alkaline refining process for the purpose of removing free fatty acids, it is found that a very large percentage of the sterols become adsorbed or otherwise associated with the soap stock and, as a result, the soap stock contains a concentration of sterols which is several times the concentration of the sterols in the original oil. Accordingly, soap stock is a suitable starting material for the present invention.

There are, however, other preferred materials as will be seen from the following. Soap stock is frequently used as a source of fatty acids. The soap stock is acidulated and any glycerides hydrolyzed. The liberated fatty acids are subjected to a distillation operation for recovery in a pure form. The undistillable material, frequently referred to as still bottoms or as vegetable residue when it is derived from vegetable oils, remaining after this distillation operation is found to contain most of the unsaponifiable material in the original soap stock. Thus, in the recovery of fatty acids from soap stock a further substantial increase in concentration of the sterols is obtained. Accordingly, such vegetable residues are a preferred starting material.

Other suitable starting materials include the residue left when whole fatty oils are hydrolyzed and the majority of the fatty acids are distilled off. Another preferred starting material is the deodorizer sludge or catch-all distillate. These materials are distillates or entrained material which are usually found in the condensers of the equipment used in fatty oil deodorization operations. Other suitable materials include tank settlings and other residual materials, commonly included in the term "foots." These materials are found to be considerably higher in sterol concentration than is the oil from which the materials are obtained.

For most efficient recovery of the sterols, the starting material should not have been subjected for any extended period of time to any previous processing at temperatures in excess of 500° F. and preferably not in excess of 485° F. For example, in the recovery of fatty acids from soap stock by the acidulation and distillation method, it is preferred that the distillation be terminated before pot temperatures exceed 485° F. In addition, it is preferred that the distillation be conducted so that the undistilled residue amounts to from 5 to 15 per cent in the case of a residue derived from a whole oil or 20 to 25 per cent in the case of a residue derived from soap stock.

The invention will be described with particular reference to the formation of methyl esters of the fatty acids although other esters such as the ethyl, propyl and butyl esters may be used.

The process involves first the alkaline saponification of the starting material in methanolic sodium hydroxide. The methanol is preferably anhydrous. This saponification results in the hydrolysis of any esters which may be present in the starting material. These esters may be glycerides carried over from the original oil or may be other esters, such as esters resulting from the reaction of sterols with the fatty acid during a distillation operation or any other operation conducted at an elevated temperature. This saponification has been found to be essential since attempts to form esters of the starting material directly have resulted in very poor yields of sterol.

After saponification the reaction mixture is neutralized preferably with sulfuric acid and a slight excess of acid is added to serve as an acid catalyst for esterification. Usually, sufficient acid is added to convert the alkali to the bisulfate. The acidified mixture is then heated, preferably at reflux temperatures, to methylate the fatty acids. After methylation is complete, the reaction mixture is neutralized and the excess methanol is recovered by distillation. As an alternative, the methanol and the inorganic salts may be washed out of the reaction mixture with water and the excess methanol recovered by rectifying the aqueous methanolic extract. In either case, the reaction mixture residue consists of methyl esters, unsaponifiables, sterols and polymeric materials resulting from polymerization during the previous processing of the fatty material.

The sterols may be recovered from the methyl ester reaction mixture in either of two ways. The methylated residue may be dissolved directly in a low-boiling petroleum solvent, or in ethylene dichloride. A small quantity of water may be added to this solution to precipitate the sterols, presumably as hydrates, which may then be separated off. A variation of this method involves the distillation of the methyl esters under a vacuum after which the distillation residue may be dissolved in the solvents mentioned above and the sterols recovered therefrom.

The second method involves the preparation of a solution as above described, either with or without previous removal of the methyl esters, and the precipitation of the sterols in the form of insoluble complexes, such as complexes with oxalic acid, hydrogen chloride, zinc chloride and the like.

It has been found that the starting materials listed above are not suitable for the direct crystallization of the sterols. Attempts to crysallize sterols directly from such materials result in negligible yields. The same is true of attempts at direct methylation of the starting materials. It is believed that during any processing involving an elevated temperature to which the starting material may be subjected, some esterification of fatty acids with sterols takes place. These sterols may be liberated by alkaline hydolysis. If this hydrolysis is carried out in anhydrous methanol, the resulting acids can be reesterified without isolation by the simple addition of an acid catalyst, such as sulfuric acid, and then refluxing. Attempts to produce an ester mixture without preliminary hydrolysis, by direct esterification of the free fatty acids followed by tranesterification of any sterol or glycerol esters which may be present, were found to be unsatisfactory and to give poor yields.

*Example 1*

200 grams of a residue obtained by distilling soybean oil soap stock which had been acidified and then hydrolyzed under pressure, was saponified by refluxing with 22 grams of 97% sodium hydroxide in 400 ml. of methanol. After 2.5 hours of refluxing, 54 grams of sulfuric acid in 200 ml. of methanol was added. This was sufficient acid to convert the alkali to the bisulfate.

The acidified mixture was refluxed 2¼ hours, cooled and treated with 700 ml. of water. This caused the esters and fatty materials to separate as a plastic mass. This was dissolved in petroleum ether and washed with water to remove the inorganic acid. Evaporation of the petroleum ether gave 204 grams of product, which was divided into portions and further processed as follows:

*a.* A 50 gram portion was dissolved in 50 ml. of warm petroleum ether and treated with 2.5 ml. of water. Crystalline sterols began to form in the solution as it cooled to room temperature. Further cooling to 5° C. gave 4.6 grams of impure crystals which could be recrystallized from isopropanol to yield 3.7 grams pure sterols, M. P. 134–136° C.

*b.* A 40 gram portion was dissolved in 35 grams of ethylene dichloride and treated at 60–70° C. with a suspension of oxalic acid in 50 grams of ethylene dichloride. Cooling produced a sterol-oxalic acid complex which was decomposed with boiling water to give 5.1 grams of impure sterols. Recrystallization of the product from isopropanol-water gave 3.6 grams of sterols.

*c.* A 100 gram portion of the methylated residue was distilled under a vacuum of .20–.35 mm. Forty-four and five-tenths grams of distillable material and 54 grams of residue (X) were obtained.

Twenty-five grams of the residue X was dissolved in 100 ml. of petroleum ether and treated with 3 ml. of water. Cooling in a refrigerator (5° C.) gave an impure crystalline product which was recrystallized from 90% isopropanol using a decolorizing carbon. Two and five-tenths grams of crystalline sterols was obtained having a melting point of 128–132° C.

Twenty-nine grams of residue X was dissolved in 75 ml. of ethylene dichloride at 65° C. This solution was treated with 4 grams of anhydrous oxalic acid suspended in 50 ml. of ethylene dichloride at 65° C. After warming at 60–70° C. for 15 minutes the solution was cooled to 5° C. This produced a semi-solid mass of sterol-oxalate complex which was separated by filtration and decomposed by boiling with water (100 ml.). The insoluble sterols were filtered off and dried. The crude product (5.6 grams) on recrystallization from ethanol gave 4.2 grams of sterols, M. P. 130–132° C.

*Example 2*

Seven hundred and one grams of a distillation residue from hydrolyzed soybean oil foots which had been prepared at temperatures not exceeding 500° F. was saponified by warming with 75 grams of sodium hydroxide in 1200 ml. of methanol. After 2 hours refluxing the mixture was allowed to cool to room temperature. This caused the mixture to solidify to a paste of sodium soaps.

The mixture was warmed to dissolve the solids and a portion was removed and acidified to regenerate the fatty acids from the soaps. Fatty material and fatty acids were extracted with petroleum ether after diluting the saponification mixture with water. Removal of the petroleum ether by distillation gave a residue having an acid number of 121.9 and a saponification number of 134.8. These values indicated that about 90% of the fatty acids in the original residue were present as soaps after saponification with methanolic alkali. The values with the original residue before saponification were: acid number 45.0; saponification number, 136.0.

Another portion of the methanolic saponification mixture, corresponding to 500 grams of original distillation residue, was treated with 81 grams of sulfuric acid (an amount sufficient to convert the alkali to $Na_2SO_4$ plus 3% excess based on the 500 grams of original residue). The acidified mixture was refluxed for 2.5 hours and a sample then removed and analyzed to determine the completeness of the methylation.

It was found that only a small fraction of the free fatty acids present in the mixture had been methylated. Therefore, enough sulfuric acid was added to convert the alkali present to the bisulfate and the rest of the reaction mixture (481.5 grams original residue) was refluxed for another 2.5 hours.

Half of the resulting mixture was neutralized to a pH of 4 to 5 and the methanol was removed by distillation. The residue which contained a considerable amount of salts was dissolved in ethyl ether and washed with water. After removal of the salts the ether was distilled and the residual product dried under vacuum (product Y).

Seventy-five grams of product Y was dissolved in 50 ml. of ethylene dichloride and treated with a suspension of 4 grams of anhydrous oxalic acid suspended in 100 ml. of ethylene dichloride. Cooling produced 14.3 grams of a mixture of oxalic acid and the sterol-oxalic acid complex. This mixture was decomposed by boiling in water and the insoluble sterols recrystallized from 90% isopropanol. The total yield 6.1 grams corresponded to an 8.9% yield from the original distillation residue which by analysis was found to contain 11.4% sterols.

Another portion of product Y (75 grams) was dissolved in 150 ml. of petroleum ether and the solution was treated with 7.5 ml. of water. Cooling produced a crop of impure sterols weighing 7.3 grams and a second more impure and oily second crop was obtained by concentrating the filtrate from the first crop. These were combined and recrystallized from 90% isopropanol using decolorizing carbon to partially remove the color from the isopropanol solution. Concentrating and cooling gave 4.7 grams of sterols, M. P. 132–134° C.

The other half of the original methylation residue was treated with water and the semi-plastic mass which separated was washed with water and dried under a vacuum. Product Z.

Seventy-five grams of product Z was dissolved in 150 ml. of petroleum ether; the solution was treated with 8 ml. of water and cooled to 5° C. This gave a dark brown impure crystalline product which on recrystallization from 90% isopropanol using decolorizing carbon gave 5.1 grams of crystalline sterols, M. P. 128–130° C.

Another seventy-five grams of the product Z were treated at 60–70° C. with 4 grams of anhydrous oxalic acid in 150 ml. of ethylene dichloride. Cooling to 5° C. gave 16.1 grams of a mixture of oxalic acid and oxalic acid-sterol complex which on decomposition with boiling water gave 12.5 grams of impure sterols.

Another 2.7 grams of oxalic acid-sterol complex was obtained by treating the filtrate from the first oxalic acid-sterol complex with 2 grams of oxalic acid.

Recrystallization of the crude sterols, obtained by treatment of the complex with water, from isopropanol gave 7.4 grams of crystalline sterols, M. P. 125–133° C.

*Example 3*

A residue similar to that described in Examples 1 and 2 was used in this experiment. The product in this case was prepared in a commercial operation by splitting and hydrolyzing soybean soap stock and then distilling until the residue amounted to 19.1% of the hydrolyzed soap stock. Temperatures were between 465–500° F. during most of the distillation, although during a short period the preferred range was exceeded. The sterol content of this product was slightly lower than the product of Examples 1 and 2 amounting to 9.3%.

Five hundred grams of the product (saponification value, 143) was saponified by refluxing it with 800 grams of methanol containing 56 grams of sodium hydroxide. After 2¼ hours 137 grams of sulfuric acid in 450 grams of methanol was added and the refluxing continued for 2 hours.

The reaction mixture was poured into 2000 grams of water and the upper plastic mass of esterified material which separated was washed with hot water to remove salts and methanol. The esterified layer was then heated at 100° C. under vacuum to remove occluded water. Yield 505 grams.

100 grams of the above material was dissolved in 100 ml. of ethylene dichloride and the solution was treated with a small amount of water enough to saturate the solution. On cooling, 8.0 grams of crude sterol product was obtained.

Another 100 grams of the product was dissolved in 100 ml. of petroleum ether and treated with a small amount (2%) of water. Cooling produced a gel of crystalline material. This impure product, which contained oily material, was redissolved in 125 ml. of petroleum ether and again treated with water to give 4.5 grams of sterols, M. P. 133.5–135° C. A second crop of sterols amounting to 1.5 grams was obtained by concentrating and cooling the filtrate from the first crop.

The sterols could also be precipitated from the methylated product by oxalic acid as described in Examples 1 and 2. One hundred grams when treated with 4 grams of anhydrous oxalic acid in 100 ml. of ethylene dichloride gave 9.2 grams of complex which upon decomposition in boiling water yielded 7.1 grams of crude sterols. Recrystallization of this product gave a material melting in the range 125–134° C.

We claim as our invention:

1. A process of recovering sterols which comprises saponifying a fatty material containing unsaponifiables including sterols, said material being selected from the group consisting of fatty acid distillation residues and deodorizer sludges, acidifying the saponification reaction mixture, esterifying the resultant fatty acids with a lower aliphatic alcohol and recovering the sterols from the esterification reaction mixture, directly without saponification of the lower aliphatic alcohol esters.

2. Process of recovering sterols which comprises saponifying a fatty material containing unsaponifiables including sterols with a substantially anhydrous methanolic alkali, said material being selected from the group consisting of fatty acid distillation residues and deodorizer sludges, acidifying the reaction mixture, heating the acidified reaction mixture to methylate fatty acids, and recovering sterols from the methyl ester reaction mixture, directly without saponification of the methyl esters.

3. Process of recovering sterols which comprises saponifying a fatty distillation residue containing unsaponifiables including sterols with a substantially anhydrous methanolic sodium hydroxide, adding sulfuric acid to the reaction mixture to make the reaction mixture acid, heating the acidified reaction mixture to methylate the fatty acids and recovering sterols from the methyl esters, directly without saponification of the methyl esters.

4. Process according to claim 3 in which the sterols are recovered by dissolving the methyl esters in a petroleum hydrocarbon solvent and saturating the resultant solution with water to precipitate the sterols.

5. Process according to claim 4 in which a portion of the methyl esters is distilled from the reaction mixture prior to the formation of the petroleum hydrocarbon solution.

6. Process according to claim 3 in which the methyl esters are dissolved in a solvent selected from the group consisting of petroleum hydrocarbons and ethylene dichloride and the sterols precipitated therefrom in the form of an insoluble complex.

7. Process according to claim 3 in which the methyl esters are subjected to distillation for removal of a major portion of the methyl esters, the distillation residue is dissolved in a solvent selected from the group consisting of petroleum hydrocarbon and ethylene dichloride and the sterols are precipitated in the form of an insoluble complex.

8. Process of recovering sterols from a distillation residue of acidulated vegetable oil soap stock, said residue being the distillation residue after recovery of the principal quantity of fatty acids as distillates and said residue constituting from 20–25% of the soap stock and not having been subjected to temperatures in excess of 500° F. for extended periods of time, which comprises saponifying said residue with substantially anhydrous methanolic alkali, acidifying the saponified reaction mixture with sulfuric acid, refluxing the acidified reaction mixture to methylate the fatty acids and recovering sterols from the resultant methyl esters, directly without saponification of the methyl esters.

9. Process according to claim 8 in which the methyl esters are dissolved in a solvent selected from the group consisting of petroleum hydrocarbons and ethylene dichloride and the sterols precipitated therefrom by means of water.

10. Process according to claim 8 in which the methyl esters are dissolved in a solvent selected from the group consisting of petroleum hydrocarbons and ethylene dichloride and the sterols are precipitated therefrom in the form of an insoluble complex.

References Cited in the file of this patent

UNITED STATES PATENTS

| | | |
|---|---|---|
| 2,167,272 | Carlson | July 25, 1939 |
| 2,432,181 | Trent | Dec. 9, 1947 |
| 2,516,834 | Bohm | Aug. 1, 1950 |
| 2,598,468 | Vaterrodt | May 27, 1952 |
| 2,610,195 | Gebbart | Sept. 9, 1952 |